FREQUENCY RESPONSIVE NETWORK

Original Filed Oct. 21, 1963 3 Sheets-Sheet 1

INVENTOR
James W. Brault
BY Marn & Jangarathis
ATTORNEYS

INVENTOR
James W. Brault
BY Mann & Jangarathis
ATTORNEYS

INVENTOR
James W. Brault
BY Marn & Jangarathis
ATTORNEYS

United States Patent Office 3,296,464

Patented Jan. 3, 1967

3,296,464

FREQUENCY RESPONSIVE NETWORK

James W. Brault, Princeton, N.J., assignor to Princeton Applied Research Corporation, a corporation of New Jersey Original application Oct. 21, 1963, Ser. No. 317,718, now Patent No. 3,270,213, dated Aug. 30, 1966. Divided and this application Dec. 20, 1965, Ser. No. 536,248

4 Claims. (Cl. 307—88.5)

This application is a division of U.S. application Serial No. 317,718 filed October 21, 1963, now U.S. Patent No. 3,270,213 granted August 30, 1966.

This invention relates generally to frequency responsive networks, and more particularly to tunable frequency responsive networks employing resistance-reactance circuit elements.

Two common forms of frequency selective band pass or band reject networks using only one type of reactance element, either inductive or capacitive, are known as Wein bridge or twin-T networks. To adapt frequency selective circuits of this type for tuning over a range of frequencies, it is necessary that two or more elements be varied in precise tracking relationship to maintain a desired frequency response characteristic for the network.

It is an object of the present invention to provide an improved frequency selective network, using only one type of reactance device, which is tunable over a relatively wide range of frequencies using only a single variable element, without significant variations in the frequency response characteristics of the network.

It is another object of this invention to provide an improved frequency selective network, using only a single type of reactance device, which may be tuned over a very wide range of frequencies using only two variable elements which need not be maintained in close tracking relation to maintain a desired frequency response characteristic.

A frequency selective network in accordance with the invention includes input circuit means with resistive and either capacitive or inductive circuit elements. Impedance isolation means such as a buffer amplifier is coupled between the input circuit means and a summing network including the series connection of a resistive circuit element and a reactive circuit element. Utilization circuit means is coupled between the junction of the series connected summing network elements and a point of reference potential. The isolation means causes a voltage to be applied across the summing network which is effectively equal to the difference between the resistive and reactive voltage components developed respectively across resistive and reactive elements of the input circuit.

To provide a relatively sharp frequency response, it is desirable that the time constant of the resistive and reactive elements of the input circuit be made approximately equal to the time constant of the resistive and reactive components of the summing network. However, due to the isolation means between the summing circuit and the elements of the input circuit, it has been found that the relationship of the time constant of the elements of the input circuit means to that of the summing network is not critical as in prior circuits. As a result, the network can be tuned over a wide range of frequencies by varying only one of the elements of the summing network. In tuning over a frequency range of about 4 to 1, it was found that the effective figure of merit or Q of the network changed only about $\pm 10\%$ and accordingly that the frequency response characteristic thereof was not materially altered over the entire frequency range to which the circuit was tuned.

Where the input circuit means includes a pair of time constant circuits each comprising a resistive and a reactive device connected in a manner similar to that of the input circuit loops of a twin-T network, it is desirable to maintain equal time constants in the two time constant circuits to provide a relatively sharp frequency response. If a network of this type is to be used to tune a frequency range significantly greater than that mentioned above and yet maintain the desired bandpass characteristic, it is necessary that the time constants of each of the time constant circuits of the input circuit means be adjusted in fairly precise tracking relation as the time constant of the summing network is varied. On the other hand, the isolation between the summing network and the input circuit means does not require that the time constant of the summing network be precisely tracked to the time constants of either of the time constant circuits of the input circuit means.

The isolation means permits a further simplification of the frequency selective network and a relaxation of the tracking requirements of the tuning elements and at the same time permits tuning of the network over a very wide range of frequencies. A simplified circuit embodying the invention includes only a single time constant circuit including resistive and reactive circuit elements across the signal input terminals to which a signal is applied. The isolation means couples the input circuit means to the summing network as aforesaid. It was found that this circuit could be tuned over a frequency range of the order of thirty to one without materially changing the frequency response thereof by simultaneous variation of individual elements in the summing and input circuits. Since the ratio of the time constants of the summing network and the input circuit can be varied over a wide range without materially altering the frequency response characteristic, precise tracking of these elements is not necessary.

It will be understood that the frequency selective network of the invention may be used in a wide variety of applications such as, but not exclusive to amplifier circuits and oscillator circuits.

The novel features which are considered to be characteristic of this invention are set forth with particularity in the appended claims. The invention itself, however, both as to its organization and method of operation as well as to additional objects and advantages thereof will best be understood from the following specification when read in connection with the accompanying drawings in which:

FIGURE 1*a* is a schematic circuit diagram partially in block form of a resistance-capacitance frequency selective network embodying the invention;

FIGURES 1*b* and 1*c* are alternate resistance-capacitance networks which can be alternatively used in the circuit of FIGURE 1*a* to produce respectively the frequency response characteristics shown in FIGURES 3*a* and 3*b*;

FIGURE 2 is a graph showing the relationship of the effective Q of the circuit of FIGURE 1*a* to the ratio of the time constant of the summing network to the time constant of the input circuit;

FIGURES 3*a* and 3*b* are graphs showing the frequency response characteristics which may be obtained with circuit of FIGURE 1*a*;

Like reference characters will be used to identify like components in the various figures of the drawings.

Figure 1:
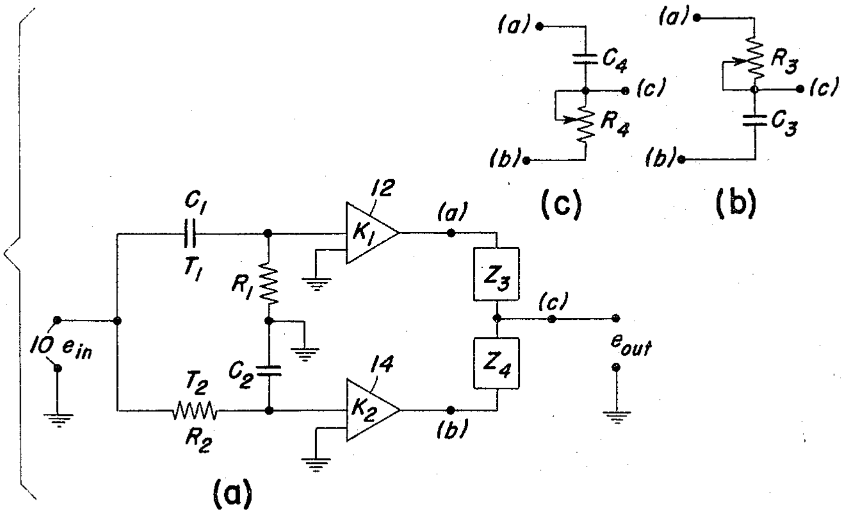

Although the circuits described and shown herein comprise only resistance-capacitance frequency selective networks it will be understood that the underlying principles are also applicable to resistance-inductance networks, and the term reactive element as used in the specification and claims will be deemed to apply to either a capacitive element or to an inductive element.

The circuit of FIGURE 1*a* bears some resemblance to that of a twin or parallel-T network, and may be analyzed in a manner somewhat similar to that set forth by H. H. Scott, "A New Type of Selective Circuit and Some Applications," Proc. I.R.E., vol. 26, pp.226–235; February 1938, and by W. N. Tuttle, "Bridged-T and Parallel-T Null Circuits for Measurements at Radio Frequencies," Proc. I.R.E., vol. 28, pp. 23–29; January 1940.

Basically the circuit of FIGURE 1*a* includes an input circuit comprising a differentiator $R_1C_1$ and an integrator $R_2C_2$ coupled to a pair of signal input terminals 10. The time constants of the differentiator and the integrator are equal. The resultant voltages across the resistor $R_1$ and $C_2$ are passed respectively through impedance isolation means 12 and 14 which may be buffer amplifiers such as cathode or emitter followers having a high input impedance and a low output impedance.

The voltage output from the isolation means 12 and 14 are combined in a summing network $Z_3$ and $Z_4$, and an output signal may be derived between the junction of the impedance elements $Z_3$ and $Z_4$ and a point of reference potential shown as ground. Impedance isolation provided by the isolation means 12 and 14 provides a new degree of freedom in the design of tunable resistance-reactance frequency responsive networks not found in tunable passive networks heretofore known in the art.

The open circuit transfer function for the circuit of FIGURE 1*a* is:

$$\frac{e_o}{e_{in}}=\frac{K_1jwT_1}{1+jwT_1}\cdot\frac{Z_4}{Z_3+Z_4}+\frac{K_2}{1+jwT_2}\cdot\frac{Z_3}{Z_3+Z_4} \quad (1)$$

where $T_1=R_1C_1$; $T_2=R_2C_2$

When it is specified that $T_1=T_2=T$ the transfer function is:

$$\frac{e_o}{e_{in}}=\frac{K_1Z_4jwT+K_2Z_3}{(1+jwT)(Z_3+Z_4)} \quad (2)$$

Considering only resistances and capacitances, there are two choices of $Z_3$ and $Z_4$ which provide circuits of differing frequency response. First, the network $Z_3$, $Z_4$ with terminals *a*, *b* and *c* may comprise a network of the type shown in FIGURE 1*b* having corresponding terminals. In this case the impedance element $Z_3$ comprises a resistor $R_3$ and the impedance element $Z_4$ comprises a capacitor $C_3$. In such a case, the network of FIGURE 1*a* is an active bandpass filter whose transfer function is:

$$\frac{e_o}{e_{en}}=\frac{jw(K_1T+K_2T_3)}{1-\omega^2TT_3+jw(T+T_3)} \quad (3)$$

where $T_3=R_3C_3$.

In the special case where $K_2=K_1=1$, the frequency of resonance becomes:

$$\omega_o=1/\sqrt{TT_3} \quad (4)$$

and the effective Q of the circuit is $$Q_{eff}=\frac{\sqrt{TT_3}}{T+T_3} \quad (5)$$

Figure 3:
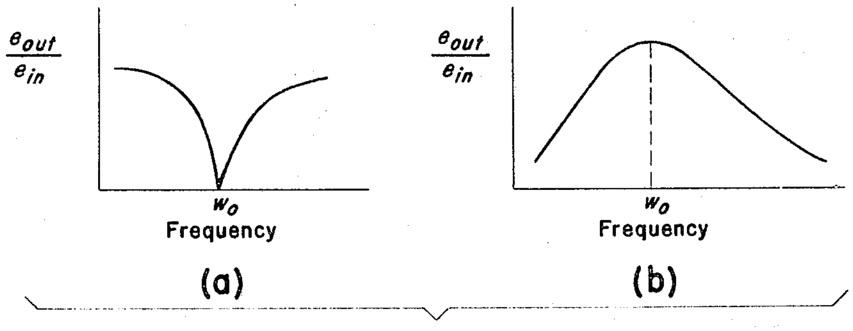

The response characteristics of the network of FIGURE 1*a* where the impedance elements $Z_3$ and $Z_4$ are resistive and capacitive respectively is shown in FIGURE 3*a*. From Equation 4 above it can be seen that the frequency of resonance can be varied by changing $T_3$. For example, either the resistor $R_3$ or the capacitor $C_3$ may be varied to change the resonance frequency. From Equation 5 above it will be seen that a variation in $T_3$ also changes the effective Q and hence the frequency bandpass response of the network.

Figure 2:
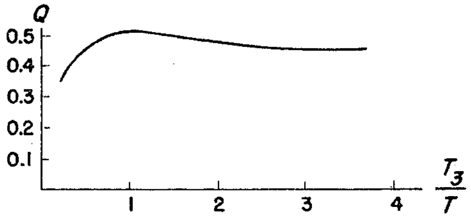

With reference to FIGURE 2 which is a plot of network Q as a function of the ratio $T_3/T$ it will be seen that $T_3$ may be varied over an extended range of about sixteen-to-one with a Q variation of only ±10%. Hence a variation of $T_3$ over a range of sixteen-to-one produced only a very slight change in Q, and, therefore, only a very small change in frequency response as the network is varied over a frequency range of about four to one. It is significant that the circuit can be tuned over such a frequency range without material changes in bandpass characteristic using only a single tuning control element such as the resistor $R_3$ or the capacitor $C_3$.

The second alternative of the circuit of FIGURE 1*a* is that the network $Z_3$, $Z_4$, with terminals *a*, *b* and *c*, may comprise a network of the type shown in FIGURE 1*c* having corresponding terminals. In this case the impedance $Z_4$ comprises a capacitor $C_4$, and the impedance element $Z_4$ comprises a resistor $R_4$. As now modified the network of FIGURE 1*a* comprises an active notch filter whose transfer function is:

$$\frac{e_o}{e_{in}}=\frac{K_2-K_1\omega^2TT_4}{(1+jwT)(1+jwT_4)} \quad (6)$$

where $T_4=R_4C_4$.

This network has a frequency null for any value of $R_4C_4$ occurring when $$\omega_o=\sqrt{K_2/K_1TT_4} \quad (7)$$

In the special case when $K_2=K_1=1$, the notch frequency is:

$$\omega_o=1/\sqrt{TT_4} \quad (8)$$

And the effective figure of merit or Q of the network is:

$$Q_{eff}=\frac{2\sqrt{TT_4}}{T+T_4} \quad (9)$$

The response characteristic of the network as now modified is shown in FIGURE 3*b*, and the notch frequency can be varied by changing $T_4$. From Equation 9 above it can be seen that $T_4$ can be varied over a relatively wide range without causing large changes in Q. Accordingly the network can be tuned over a relatively wide range of frequencies by adjusting only a single control element such as $R_4$ or $C_4$, without causing a material change in frequency response.

In order to increase the frequency range over which the network of FIGURE 1 may be tuned while maintaining a given tolerance of Q variation, then T must be varied as well as $T_3$, or $T_4$. An important condition of the network is that $T=T_1=T_2$, accordingly $T_1$ and $T_2$ must be varied in close tracking relation or the transmission of the network at resonance deteriorates rapidly. On the other hand, due to the isolation means 12 and 14, there is no stringent requirement that $T_3$ closely track $T_1$ and $T_2$. The actual extended tuning of the circuit of FIGURE 1 may be effected by ganging $R_1$ and $R_2$ with the resistor in the summing network for unicontrol operation, if special care is taken to insure that $R_1$ and $R_2$ are adjusted in close tracking relation.

Figure 4:
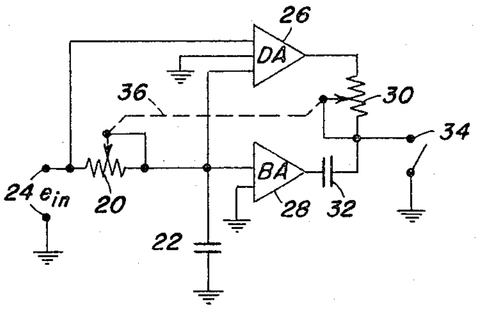
FIGURE 4 is a schematic circuit diagram partially in block form of a resistance-capacitance frequency selective circuit in accordance with an embodiment of the invention.

The frequency selective network of FIGURE 4 simplifies the extended range tuning problem by eliminating the need for two separate tuning control devices in the input circuit. This network is capable of covering a frequency range of the order of thirty to one by varying simultaneously only two resistors which need not be kept in precise tracking relation. The input circuit of the FIGURE 4 network includes a series variable resistor 20 and a shunt capacitor 22. The voltage across the resistor 20 which is the difference between the input voltage at the terminals 24, and the voltage across the capacitor 22, is applied to the unity gain difference amplifier 26. The output voltage of the amplifier 26, which provides impedance isolation between its input and output terminals, thus corresponds to the voltage across the resistor 20.

The voltage across the capacitor 22 is applied to a unity gain buffer amplifier 28. The summing network which includes a variable resistor 30 and a capacitor 32 is connected between the difference amplifier 26 and the buffer amplifier 28. The total voltage across the summing network is a function of the difference between the voltage across the resistor 20 and the voltage across the capacitor 22 and impedance isolation is provided between the input circuit and the summing circuit by the amplifiers 26 and 28.

An output or utilization circuit is connected to a pair of output terminals 34 one of which is at ground potential, and the other of which is connected to the junction of the resistor 30 and the capacitor 32.

The frequency selective network is tuned by the simultaneous adjustment of the resistors 30 and 20 which may be ganged for unicontrol operation as indicated by the dashed line 36. Resistors 30 and 20 are adjusted to maintain the time constant of the resistor 20-capacitor 22 network approximately equal to the resistor 30-capacitor 32 network. As noted above in connection with FIGURE 3, the ratio of the time constant of the summing network to that of the input circuit may vary over a relatively wide range without appreciably altering the Q or the frequency response characteristic of the network.

The circuit of FIGURE 4 comprises a bandpass network having a frequency response characteristic as shown in FIGURE 2*a*. If desired, the circuit may be altered to provide a null response characteristic as shown in FIGURE 2*b* by interchanging the positions of the variable resistor 30 and the capacitor 32. Alternatively a null response network may be produced by interchanging the positions of the variable resistor 20 and the capacitor 22. If desired, a bandpass characteristic may be produced by interchanging the positions of the variable resistor 30 and the capacitor 32 as well as the positions of the variable resistor 20 and the capacitor 22.

Figure 5:
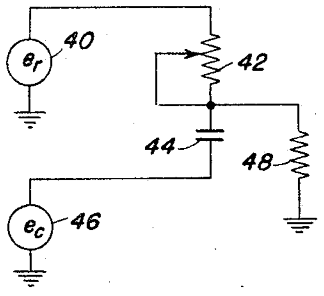
FIGURE 5 is an equivalent circuit diagram representative of the circuits of FIGURES 1*a* and 4.

The circuits of FIGURES 1*a* and 4 may be represented by the equivalent circuit diagram of FIGURE 5. A voltage source 40 providing a voltage $e_r$ is connected between a point of reference potential, shown as ground, and one end of the summing network comprising a variable resistor 42 and a capacitor 44 connected in series. A voltage source 46 providing a voltage $e_c$ is connected between ground and the other end of the summing network. Utilization circuit means is represented by a load resistor 48 connected between ground and the junction of the resistor 42 with the capacitor 44.

The voltage source 40 provides a voltage $e_r$ equivalent to that developed across the resistor $R_1$ of FIGURE 1, or the resistor 20 of FIGURE 4. In like manner, the voltage source 46 provides a voltage $e_c$ equivalent to that developed across the capacitor $C_2$ of FIGURE 1 or the capacitor 22 of FIGURE 4.

Figure 6:
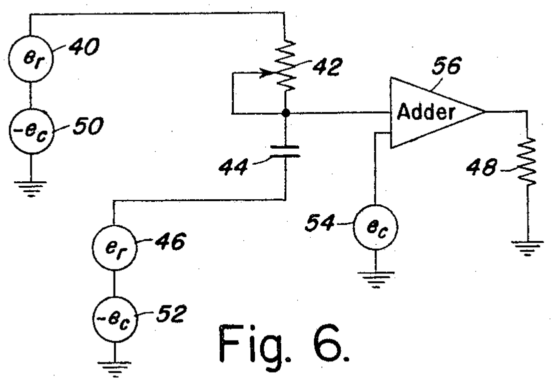
FIGURE 6 is an equivalent circuit diagram illustrating a modification of the equivalent circuit diagram of FIGURE 5.

The equivalent circuit of FIGURE 6 is a modification of that shown in FIGURE 5 wherein the voltage sources 40 and 46 are connected to ground respectively through voltage sources 50 and 52 each providing a voltage $-e_c$. Voltage $-e_c$ is the same as the voltage $e_c$ from the source 46 except that it is shifted in phase by 180°. To balance out the effects of the additional voltage sources 50 and 52, a voltage source 54 providing a voltage $+e_c$ is added to the output voltage from the summing network in an adder circuit 56. The adder circuit provides impedance isolation between the voltage source 54 and the summing network.

Figure 7:
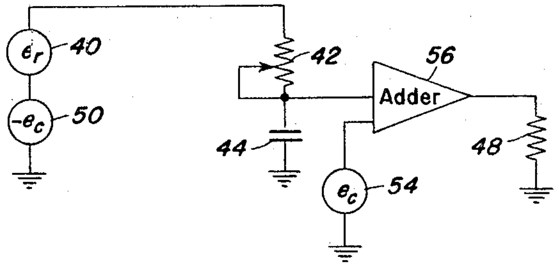
FIGURE 7 is an equivalent circuit diagram representing a simplification of the equivalent circuit diagram of FIGURE 6.

Since the voltage sources 46 and 52 provide equal and opposite voltages, they may be eliminated, and the terminal of the capacitor 44 to which these sources were connected may be grounded as shown in FIGURE 7. The circuit of FIGURE 7 provides an advantage over that of FIGURE 4 in that particular care must be exercised in the design of the amplifier 28 which drives the capacitor 32, so that the output resistance thereof does not adversely affect the time constant of the summing network. As shown in FIGURE 7, the capacitor 44 is grounded, and only the resistor 42 is driven from the input circuit.

The equivalent circuit diagram shown in FIGURE 7 may be redrawn by replacing the voltage sources 40 and 50 with an equivalent voltage source 58 which provides a voltage $e_{in}-2e_c$. Note with respect to FIGURE 4 that the sum of the voltages across the resistor 20 ($e_r$) and the capacitor 22 ($e_c$) is equal to the signal input voltage ($e_{in}$). Also in FIGURE 1 when $T_1=T_2$, the sum of the voltages across the resistor $R_1$ and the capacitor $C_2$ is equal to the signal input voltages. This relationship is expressed as:

$$e_{in}=e_r+e_c \qquad (10)$$

or alternatively as:

$$e_r=e_{in}-e_c \qquad (11)$$

Figure 8:
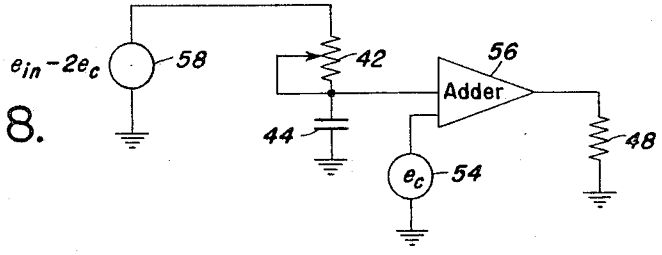
FIGURE 8 is an equivalent circuit diagram illustrating a modification of the equivalent circuit diagram of FIGURE 7.

Replacing the voltage source 40 of FIGURE 7 with its equivalent $e_{in}-e_c$ as noted in Equation 11, and combining with the voltage source 50 ($-e_c$) provides a resultant voltage source $e_{in}-2e_c$ as shown in FIGURE 8.

Figure 9:
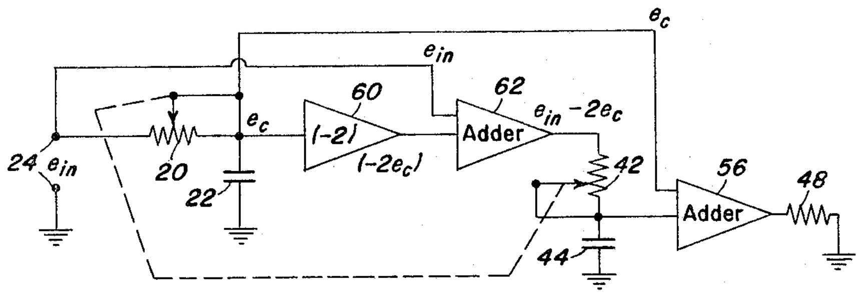
FIGURE 9 is a schematic circuit diagram partly in block form representing an exemplification of the equivalent circuit diagram of FIGURE 8.

FIGURE 8 is the equivalent circuit diagram of the schematic circuit diagram, partly in block form shown in FIGURE 9. A signal input voltage $e_{in}$ applied to a pair of input terminals 24, is developed across the series combination of a resistor 20 and capacitor 22 in the same manner as shown in FIGURE 4. The voltage across the capacitor 22 is applied to an amplifier 60 which provides a gain of two and a phase reversal of the input signal. The output signal from the amplifier 60 (($-2e_c$) is applied together with the input signal ($e_{in}$) to an adder circuit 62. The output signal from the adder circuit 62 drives the summing network 42, 44 as described above.

The voltage across the capacitor 22 is also applied to the adder circuit 56 previously described in FIGURES 6–8. It should be noted that the adder circuits 56 and 62 not only serve to linearly add the signals applied thereto, but also provide impedance isolation between the input circuit and the summing circuit.

The circuit of FIGURE 9 provides a bandpass response characteristic of the type shown in FIGURE 3*a*. The frequency of response may be varied over an extremely wide frequency range, of the order of thirty to one, by conjointly varying the resistors 20 and 42 in approximate tracking relation. The tracking is not critical, and with relatively wide variations between the time constants of the input and summing circuits, the Q or frequency response characteristic of the network remains substantially constant over the entire frequency range.

The frequency response characteristic of the network may be changed to provide a null by reversing the positions of the resistor and capacitor in either the input or summing circuits. If the positions of the resistor and capacitor in both the input and summing circuits are reversed, then the network again exhibits a bandpass characteristic.

At this point it should be noted with respect to the figures discussed thus far that resistance-inductance networks may also be used to provide wide range tuning. Furthermore, a resistance-capacitance network and a resistance-inductance network can be used respectively in the input and summing circuits or vice versa, to provide wide range tuning.

Figure 10:
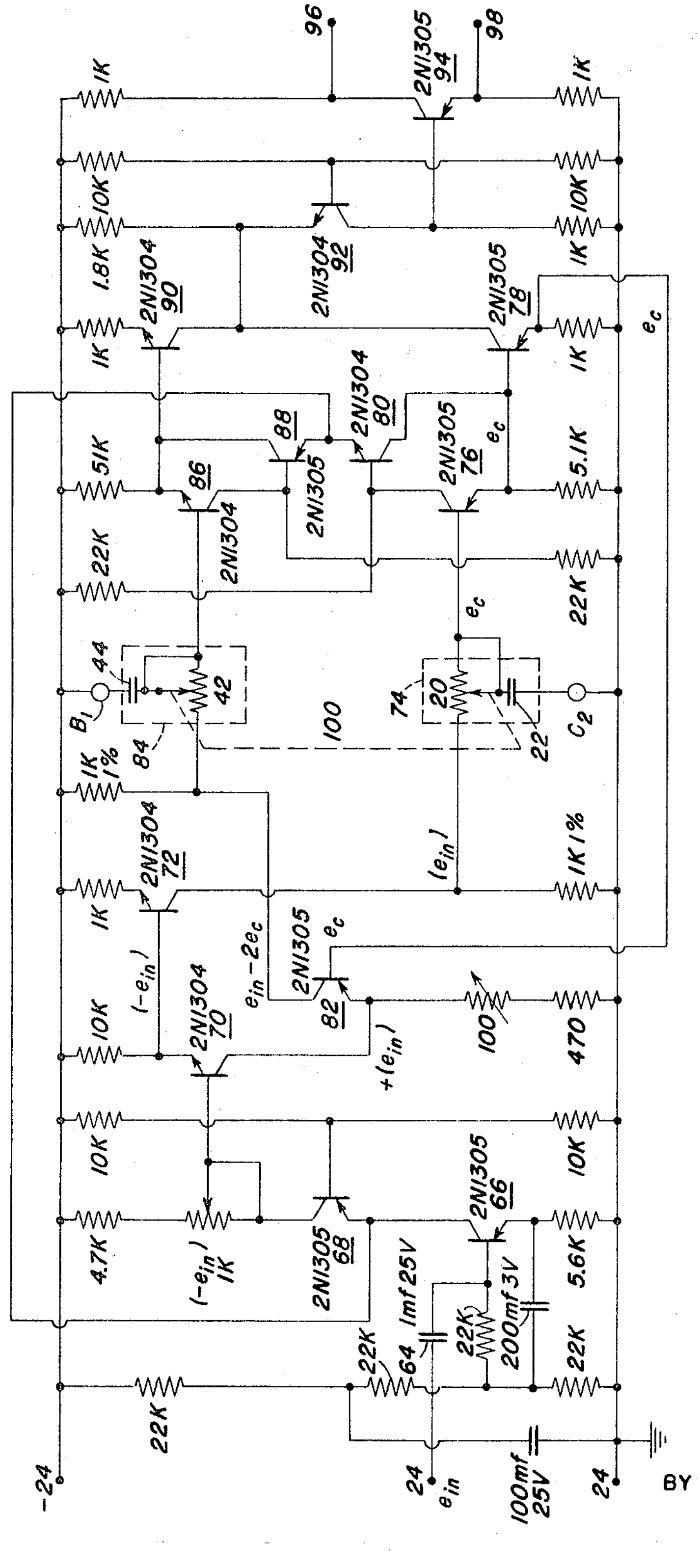
FIGURE 10 is a detailed schematic circuit diagram of a tunable frequency selective amplifier embodying the invention.

A practical exemplification of the block diagram circuit of FIGURE 9 is shown in the schematic circuit diagram of FIGURE 10. The circuit of FIGURE 10 comprises an amplifier which is tunable over a range of about thirty to one. The various transistor stages used in this amplifier are of conventional design, and accordingly a detailed description of all the circuit components is unnecessary.

A signal input voltage $e_{in}$ to be amplified is applied to a pair of input terminals 24 and is coupled through a capacitor 64 to the base electrode of a transistor 66. The transistor 66 and a transistor 68 are connected in cascode relation. The amplified input signal $e_{in}$ is developed in the collector circuit of the transistor 68 and applied to the base electrode of a transistor 70 which is connected as a phase splitter.

One output signal from the phase splitter is developed across the emitter resistor of the transistor 70 and applied to a phase inverter stage including a transistor 72. The signal voltage developed at the collector electrode of the transistor 72 corresponds to, and is in phase with the applied signal voltage $e_{in}$, and is applied to the input circuit time constant network 74. As mentioned hereinabove with reference to FIGURES 4 and 9 the input circuit time constant network comprises a series variable resistor 20 and a shunt capacitor 22.

The voltage developed across the capacitor $e_c$ is applied to the base electrode of a transistor 76. The output signal from the transistor 76 is developed at its emitter electrode. The collector electrode of the transistor 76 is directly connected to the base electrode of a transistor 80. The collector electrode of the transistor 80 is connected in common to the emitter electrode of the transistor 76 to provide a feedback loop to raise the input impedance and lower the output impedance of the transistor 76. The signal at the emitter electrode of the transistor 76 is applied to the base electrode of a transistor 78, which is connected as an emitter follower.

The voltage $e_c$ at the emitter electrode of the transistor 78 is applied to the base electrode of a transistor 82, which provides two times gain for signals applied to its base electrode. The signal current corresponding to $e_{in}$ at the collector electrode of the transistor 70 flows into the emitter electrode of the transistor 82, and a resultant output signal $(e_{in}-2e_c)$ is developed at the collector electrode of the transistor 82. Thus, the circuit including the transistor 82 corresponds to the amplifier 60 and the adder circuit 62 of FIGURE 9.

The resultant voltage $(e_{in}-2e_c)$ at the collector electrode of the transistor 82 is applied to the summing network 84 which includes a variable resistor 42 and capacitor 44 connected in series between the collector of transistor 82 and a point of reference potential which in this case is the negative terminal of the operating potential supply.

The resultant voltage across the capacitor 44 is applied to a transistor 86 which is connected as an emitter follower. The output current from the collector electrode of transistor 86 provides base current drive for a transistor 88. The collector electrode of the transistor 88 is connected in common to the emitter electrode of the transistor 86 to provide a feedback loop to raise the input impedance and lower the output impedance of the transistor 86.

The collector electrode of the transistor 90 and the collector electrode of the transistor 78 are connected in common to provide an adder circuit corresponding to the adder circuit 56 of FIGURE 9. In order to maintain the circuit in balance, the gain from the base electrode of the transistor 86 to the collector electrode of the transistor 92 matches the gain from the base electrode of the transistor 76 to the collector electrode of the transistor 92.

The signal output voltage from the adder circuit is taken from the collector electrode of the transistor 92 and os applied to a phase splitter including a transistor 94. The output terminals from the network comprise either of the terminals 96 or 98 and ground.

A regenerative feedback network is provided from the emitter electrodes of the transistors 80 and 88 to the collector electrode of the transistor 66 to enhance the overall frequency response of the network. In this respect it will be noted that the transistors 80 and 88 are connected to add the currents through the emitter resistors of the ransistors 76 and 86 so as to produce a resultant feedback signal corresponding to the output signal from the network, but isolated therefrom.

The amplifier of FIGURE 10 is tuned by varying the resistors 20 and 42 in rough tracking relation. If desired, the resistors may be ganged for unicontrol operation as indicated by the dashed line 100. The particular band of frequencies over which the amplifier is tunable is a function of the time constants of the input and summing circuits. A practical example of an amplifier provides a tuning range of 1.5 c.p.s. to 150 kc. in five bands by simultaneously switching different capacitors in place of the capacitors 22 and 44 when going from one band to another. The time constants of the input and summing networks are kept equal, but as described above considerable latitude in this relationship can be tolerated without affecting the Q of the network. As a result, the troublesome and expensive requirement of maintaining close tracking relation between the resistors 20 and 42 is eliminated.

Of considerable importance is the fact that circuits embodying the invention maintain the transmission characteristic of the network at resonance constant as the circuit is tuned over its wide frequency range. The reason that this is important in the circuit of FIGURE 10 is that the feedback loop magnifies any changes in the transmission characteristic of the network and thereby seriously changes the gain and selectivity of the overall circuit.

What is claimed is:

1. A tunable frequency selective network comprising in combination,
   input circuit means including a pair of time constant circuits each comprising resistive and reactive circuit elements connected in series between a signal input terminal and a point of reference potential for said network,
   the time constants of said time constant circuits being equal,
   summing circuit means including resistive and reactive circuit elements,
   isolation circuit means coupled between said input circuit means and said summing circuit means, and
   means for adjusting the value of one of said circuit elements of said summing circuit means to tune said frequency selective network.

2. A frequency selective network comprising in combination,
   means providing an input terminal, and a common terminal,
   input circuit means including a first resistive circuit element and a first reactive circuit element serially connected in the order named between said input and common terminals, and a second reactive circuit element, and a second resistive circuit element connected in the order named between said input and common terminals, the time constant of said first resistive element and said first reactive element being equal to the time constant of said second resistive element and said second reactive element, first impedance isolation means including an input circuit coupled across said first reactive circuit element, and an output terminal, second impedance isolation means including an input circuit coupled across said second resistive circuit element, and an output terminal, summing circuit means including a third resistive circuit element and a third reactive circuit element connected in series between the output terminals of said first and second impedance isolation means, the time constant of said summing circuit means being substantially equal to the time constant of said first resistive circuit element and said first reactive circuit element, output circuit means coupled between the junction of said third resistive circuit element and said third reactive circuit element and said common terminal, and means for adjusting one of said third resistive circuit elements and third reactive circuit elements to tune said frequency selective network.

3. A frequency selective network as defined in claim 2 wherein said reactive elements comprise capacitors and the third resistive element and third reactive element are connected in the order named between the output terminals of said first and second impedance isolation means.

4. A frequency selective network as defined in claim 2 wherein said reactive elements comprise capacitors and the third resistive element and third reactive element are connected in the order named between the output terminals of said second and first impedance isolation means.

No references cited.

ARTHUR GAUSS, *Primary Examiner.*

D. FORRER, *Assistant Examiner.*